United States Patent [19]

DeHart, Sr.

[11] Patent Number: 5,085,450

[45] Date of Patent: Feb. 4, 1992

[54] STEP STALL PREVENTION FOR VEHICLE STEPS

[75] Inventor: Larry DeHart, Sr., Placentia, Calif.

[73] Assignee: The Dometic Corporation, Evansville, Ind.

[21] Appl. No.: 626,981

[22] Filed: Dec. 13, 1990

[51] Int. Cl.⁵ .............................................. B60R 3/02
[52] U.S. Cl. .................................................. 280/166
[58] Field of Search ................ 280/166, 163; 105/444, 105/443; 182/88

[56] References Cited

U.S. PATENT DOCUMENTS

| | | | |
|---|---|---|---|
| 3,403,926 | 10/1968 | Way et al. | 280/166 |
| 4,027,807 | 6/1977 | Thorley | 280/166 |
| 4,110,673 | 8/1978 | Nagy et al. | 280/166 |
| 4,116,457 | 9/1978 | Nerem et al. | 280/166 |

Primary Examiner—David M. Mitchell
Attorney, Agent, or Firm—Pearne, Gordon, McCoy & Granger

[57] ABSTRACT

A system for extending and retracting a step, such as a step of a recreational vehicle, includes an electric motor coupled to extend and retract the step, and a circuit for energizing the motor. The circuit comprises a first circuit including a circuit breaker and connected to selectively energize the motor via the circuit breaker in one rotation direction to extend and retract the step, and a second circuit responsive to opening of the circuit breaker for energizing the motor in an opposite rotation direction to retract the step.

11 Claims, 7 Drawing Sheets

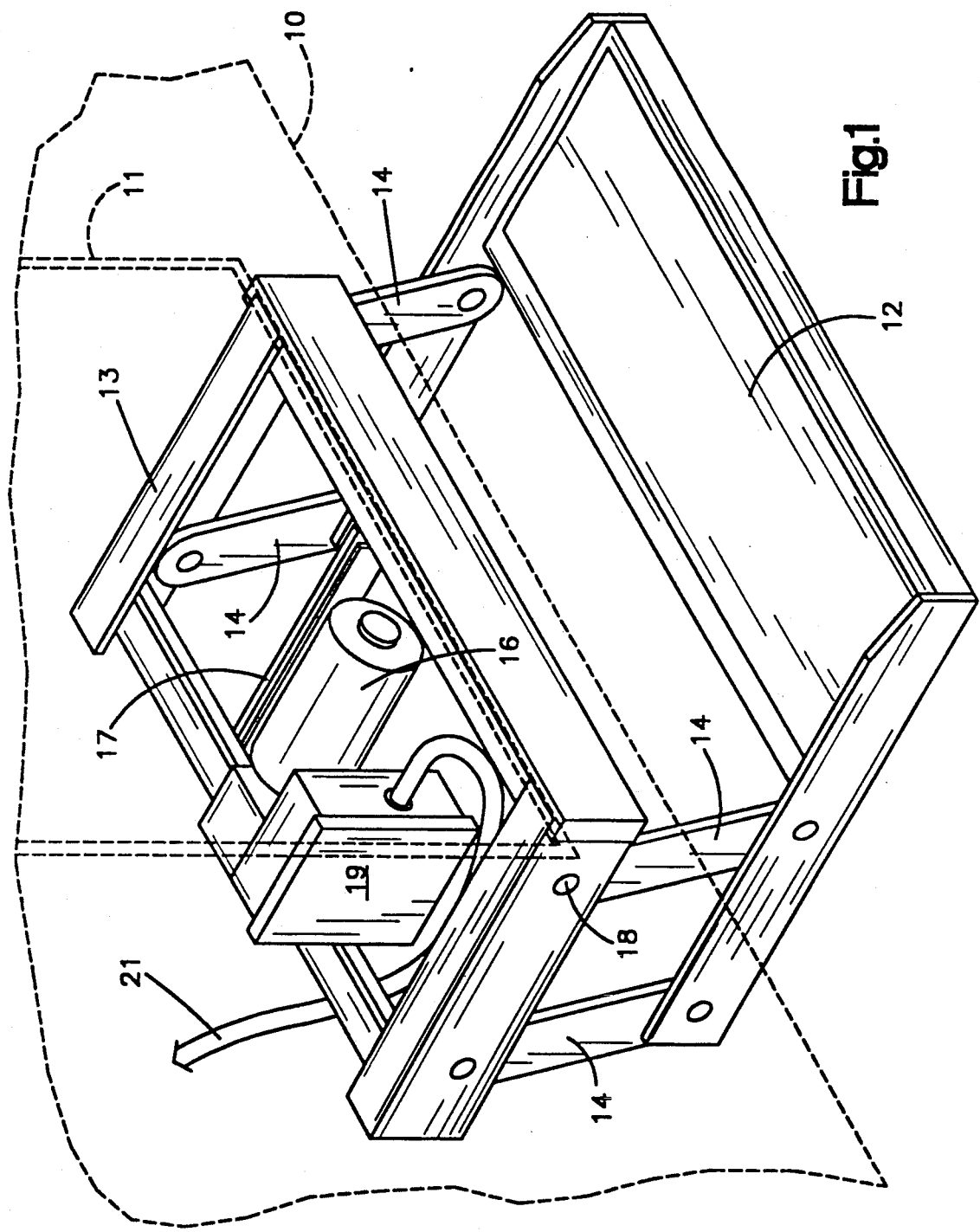

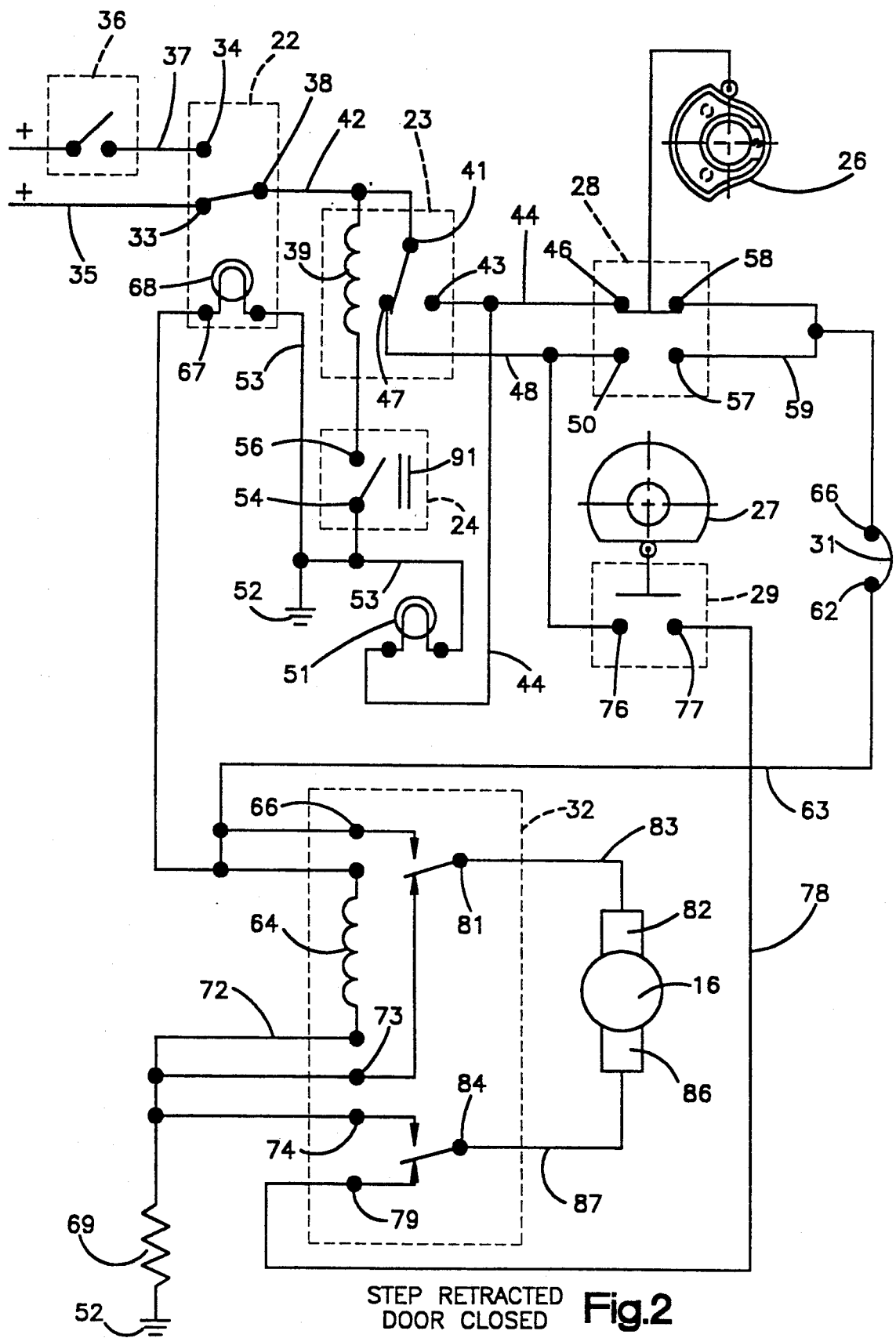
STEP RETRACTED
DOOR CLOSED   Fig.2

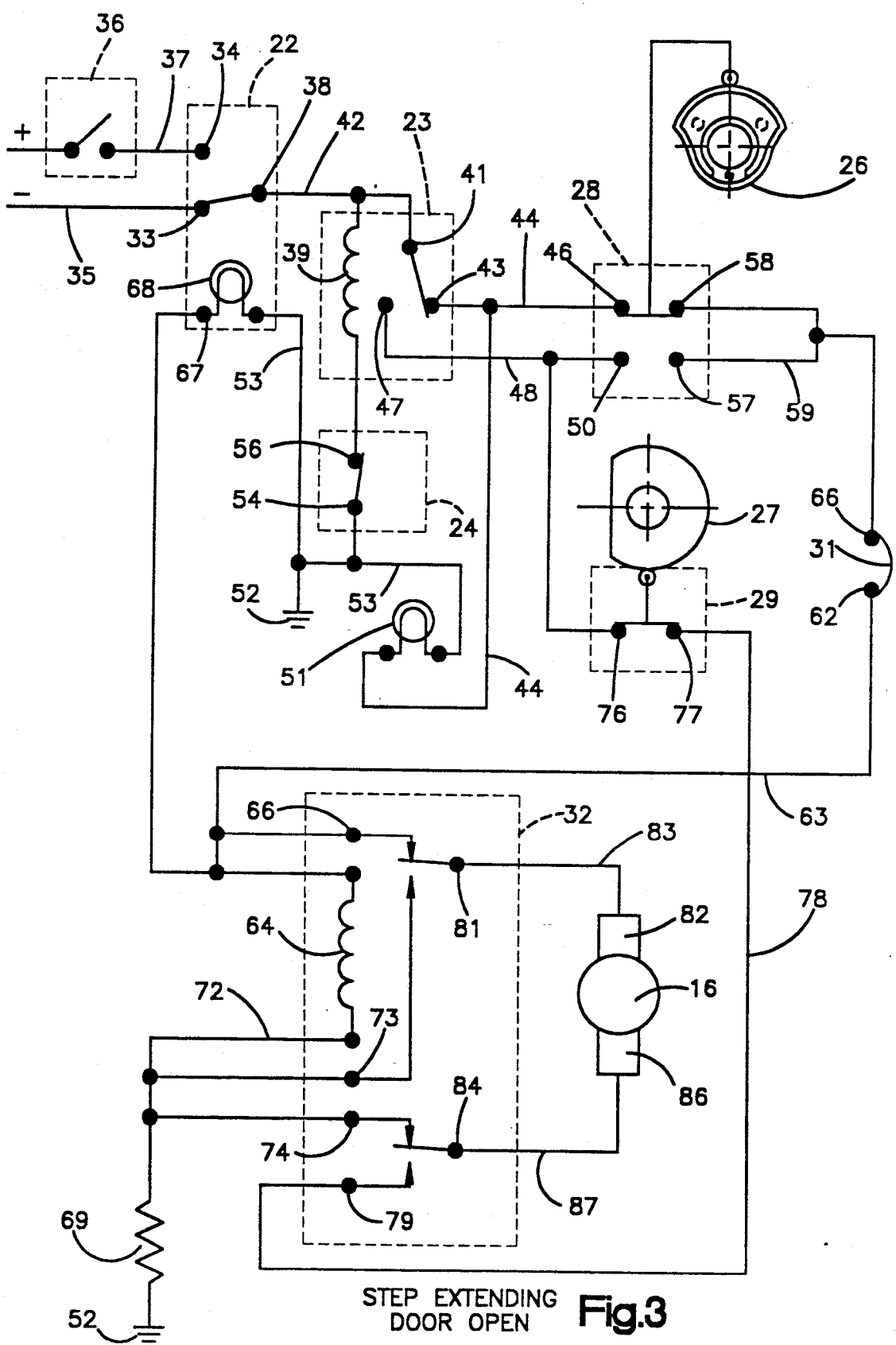
STEP EXTENDING
DOOR OPEN   Fig.3

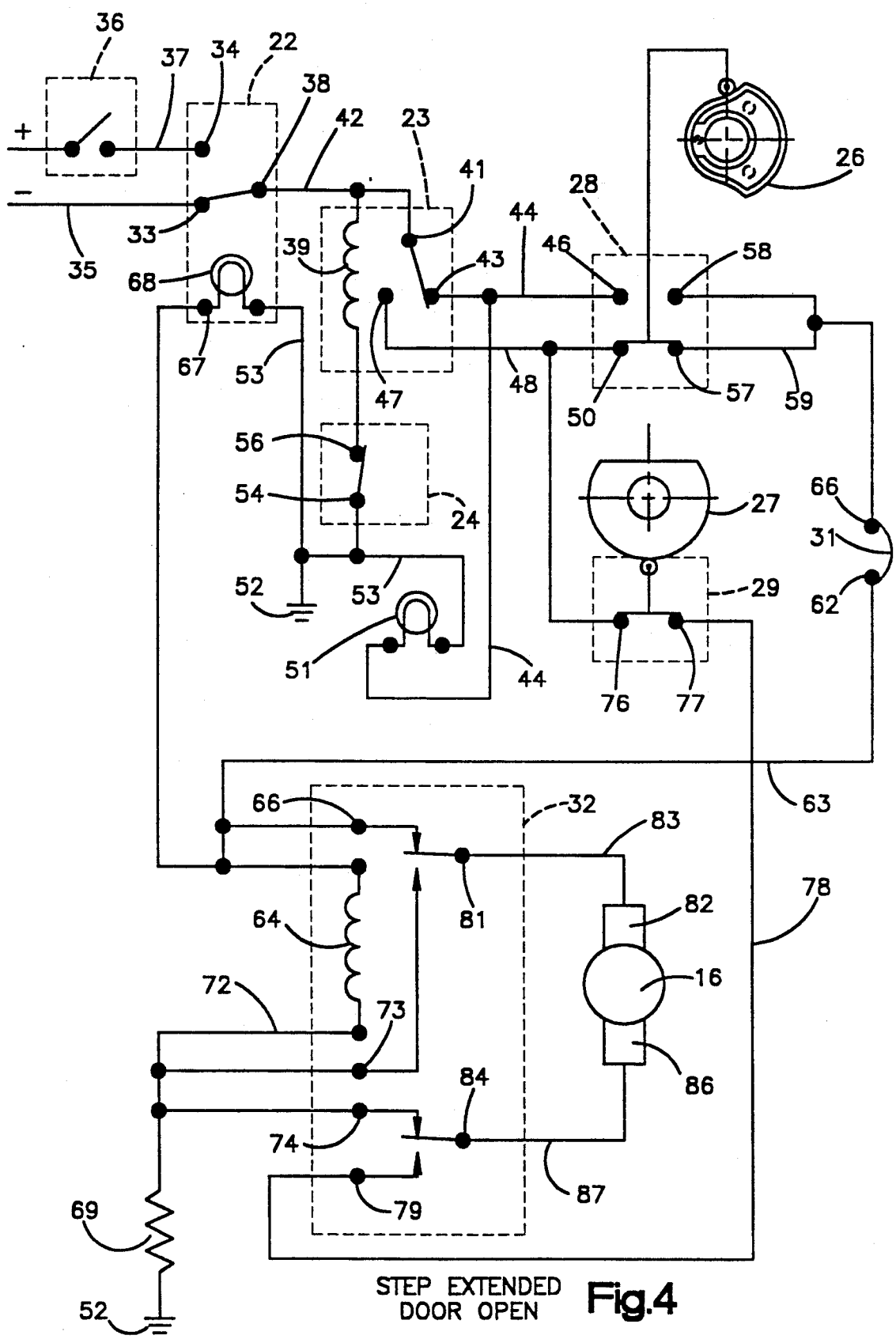
STEP EXTENDED DOOR OPEN  Fig.4

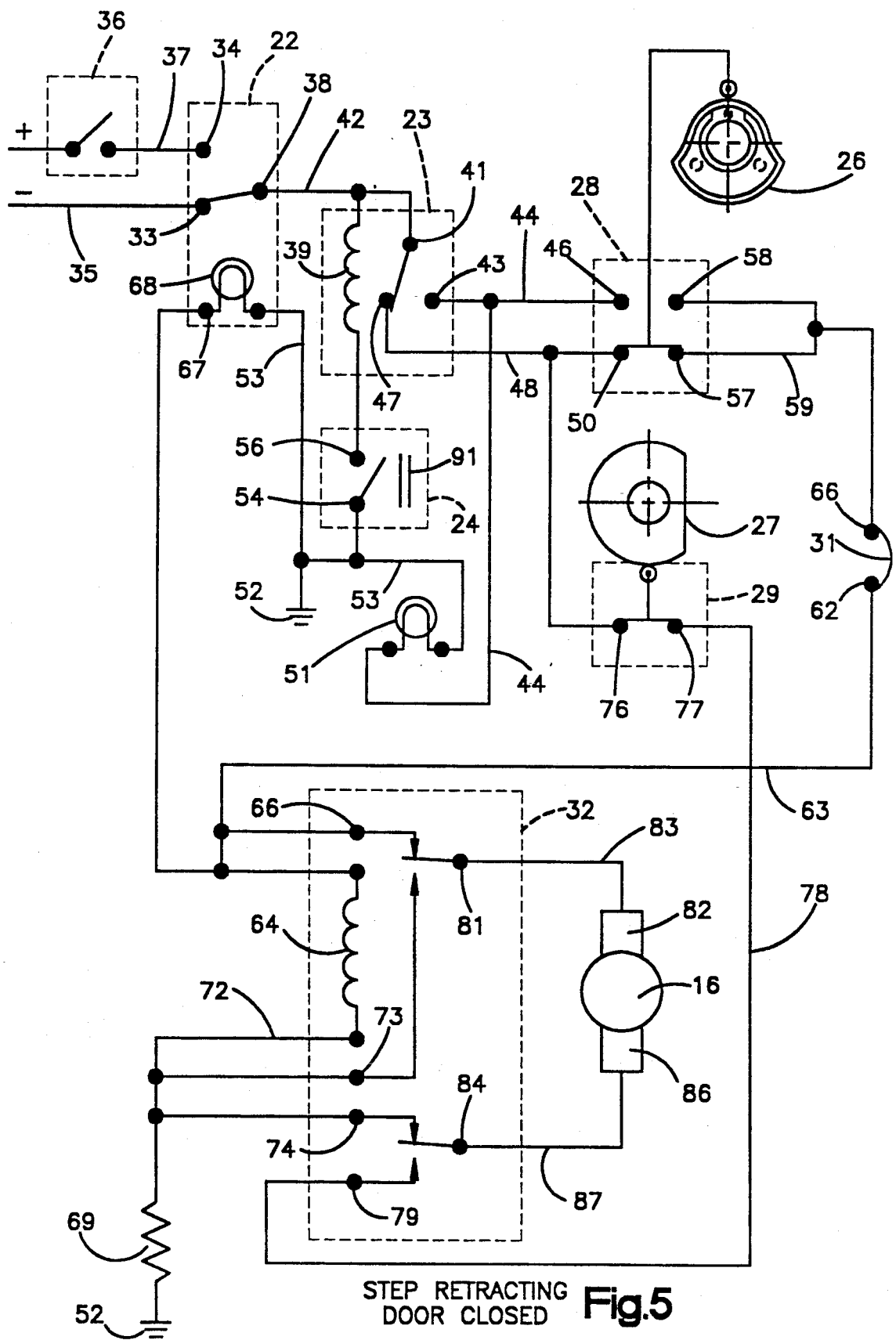
STEP RETRACTING DOOR CLOSED Fig.5

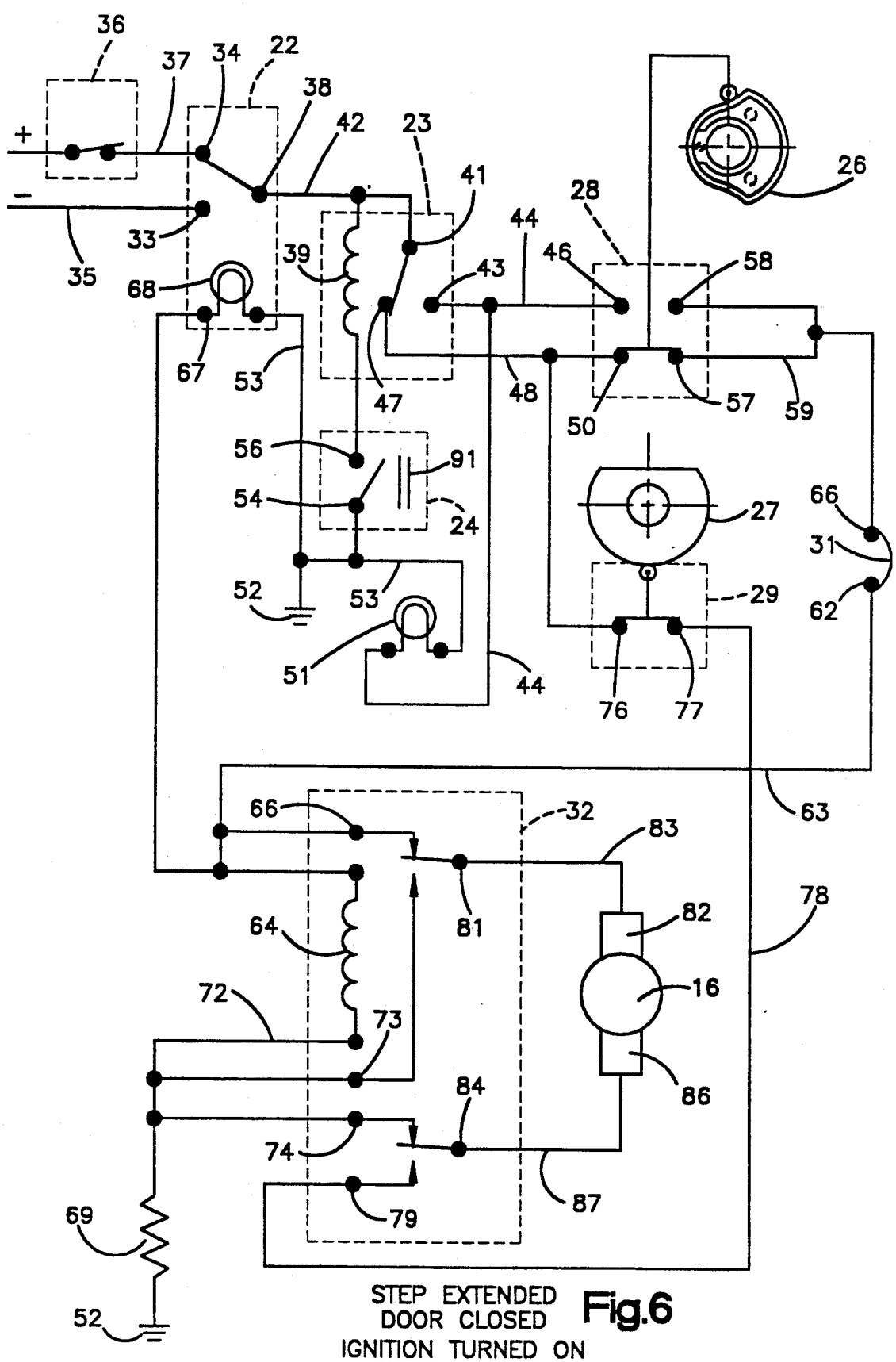
STEP EXTENDED
DOOR CLOSED  Fig.6
IGNITION TURNED ON

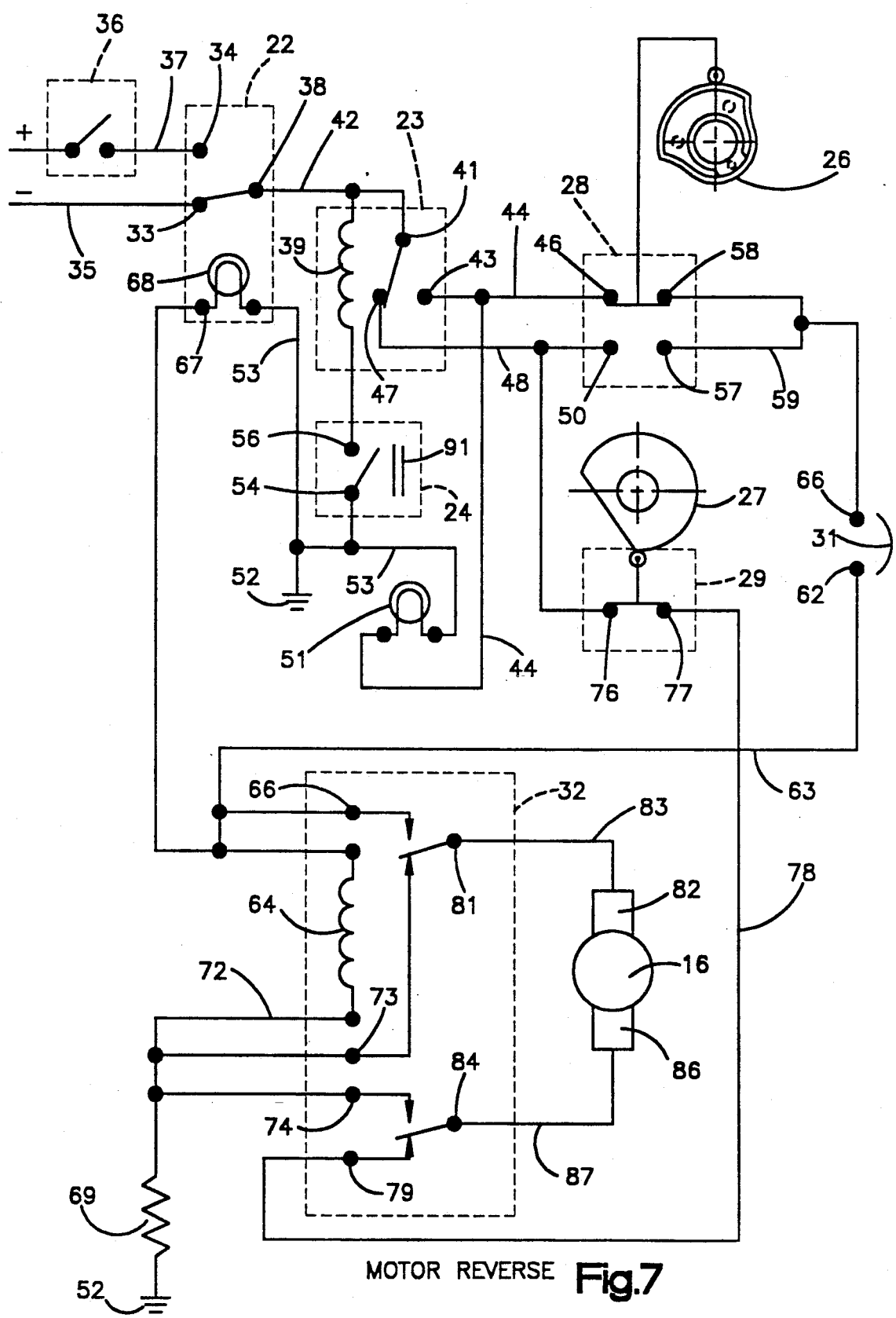
MOTOR REVERSE Fig.7

STEP STALL PREVENTION FOR VEHICLE STEPS

BACKGROUND OF THE INVENTION

This invention relates to movable steps for vehicles such as, for example, recreational vehicles, and more particularly is directed to the provision of means for preventing the stalling of such steps intermediate the end positions thereof.

PRIOR ART

Vehicles such as recreational vehicles are frequently provided with steps to make it easier for a person to enter and leave the interior of the vehicle, e.g., via a side door on the vehicle. Since such steps may extend laterally of the vehicle, it is desirable to provide means for withdrawing or retracting the steps to prevent the steps from hitting objects when the vehicle is moving. The arrangements for moving the steps are frequently motor-controlled, with circuits being provided for controlling the energization of the motor.

When the steps are extended, it is possible that they may strike an object, such as a curb, before they are fully extended. This may cause stalling of the motor at a position at which the steps are not fully extended, resulting in damage to the circuitry, motor, and steps and inconvenience to the user. A similar condition can exist if the step becomes clogged with snow or ice.

SUMMARY OF THE INVENTION

The present invention provides a simple, very reliable, and low-cost control circuit for preventing damage to the system in the event that the step encounters a condition in which it cannot fully extend and therefore stalls. A simple overload circuit breaker is incorporated in the control circuit. When the step stalls for any reason, the circuit breaker is subjected to excessive current due to the locked rotor condition of the motor, and therefore opens. In such event, the circuit produces a reversal in the motor. This causes the motor to run backwards and retract the step.

Preferably, the circuit breaker is of an automatic reset type. In such instance, when the circuit breaker automatically resets, the step automatically recycles and again attempts to extend. If a stall condition continues, the circuit breaker again operates, and the step again attempts to extend.

The automatic reset circuit breaker is preferably selected to provide sufficient "off time" to prevent motor damage, even if the system recycles a number of times. Further, since the recycling can occur only when the door is open, the vehicle occupant will become aware of the problem and take appropriate action to prevent continued recycling. Once the door is closed, opening of the circuit breaker causes motor reversal and step retraction.

Briefly stated, the illustrated embodiment of this invention is directed to an improved system for extending and retracting a step. It includes an electric motor coupled to extend and retract the step and a circuit for energizing the motor. In accordance with the invention, the circuit comprises a first circuit means including a circuit breaker connected to selectively energize the motor via the circuit breaker in one rotational direction to extend and retract the step. A second circuit means is provided which is responsive to opening of the circuit breaker for energizing the motor in the opposite rotational direction to retract the step.

The system may further comprise a first cam-operated switch connected to apply operating current to the first circuit, shaft means coupled to the motor, and first cam means coupled to the shaft means for operating the first cam-operated switch. In this arrangement, the first cam-operated switch has first and second contact paths. The first cam means comprises means for selectively closing the first and second contact paths at predetermined angular displacements of the shaft means. The second circuit means includes a second cam-operated switch and second cam means coupled to the shaft means for operating the second cam-operated switch during extension of the step, and means for selectively applying operating current to the second circuit means.

The system may include a relay having a relay coil connected to be energized via the circuit breaker, in which case the first circuit means comprises normally open contacts of the relay connected to apply current of one polarity to the motor via the circuit breaker. In this arrangement, the second circuit means may comprise normally closed contacts of the relay connected to apply current of a polarity opposite the one polarity to the motor.

The invention is also directed to an improvement in a system for extending and retracting a step of a vehicle, including an electric motor coupled to move the step between an extended position and a retracted position, and a circuit for energizing the motor, the step being positioned adjacent a door of the vehicle. The circuit comprises a circuit breaker, a door switch having "door open" and "door closed" contacts and a center contact adapted to be connected to a source of current. A first cam switch is connected respectively between the "door open" and "door closed" contacts and one terminal of the circuit breaker. First circuit means are provided for selectively connecting the motor to the other terminal of the circuit breaker for energizing the motor with a current of a first polarity for extending and retracting the step. Second circuit means responsive to an open condition of the circuit breaker are provided for energizing the motor with a current of a second polarity opposite the first polarity for retracting the step.

This arrangement may further comprise shaft means coupled to the motor for rotating first cam means for selectively closing the first and second cam switches, respectively, whereby the first cam switch closes upon retraction of the step and the second cam switch closes upon extension of the step. The second circuit means may include another cam switch and second cam means on the shaft means for closing another cam switch while the step is being extended.

The system may further comprise a relay having a coil connected to the other terminal of the circuit breaker, in which case, the first circuit means may include normally open contacts of the relay connected to apply current of one polarity to the motor via the circuit breaker, and the second circuit means may include normally closed contacts of the relay connected to apply current of a polarity opposite the one polarity to the motor.

In a further arrangement of the invention, for use in a vehicle having an ignition switch, the system may comprise a control switch having a first position for applying current to the center contact of the door switch and a second position for connecting the ignition switch to the center contact. This arrangement minimizes the risk that the vehicle will be driven with the step still extended.

BRIEF DESCRIPTION OF THE DRAWING

In order that the invention may be more clearly understood, it will now be disclosed in greater detail with reference to the accompanying drawing, wherein:

FIG. 1 is a partial perspective view of one arrangement of steps for a recreational vehicle that may incorporate the present invention;

FIG. 2 is a circuit diagram illustrating the control circuit for the step in a condition when the step is retracted, the door is closed, and the selector switch is in the operative position;

FIG. 3 illustrates the circuit condition when the door is open while the selector switch is in the operative position and the step is extending;

FIG. 4 illustrates the circuit condition when the door is open and the step is fully extended;

FIG. 5 illustrates the circuit condition when the door is closed and the step is retracting;

FIG. 6 illustrates the circuit condition when the door is closed while the step is extended and the selector switch is in the non-operation position, with the vehicle ignition switch "off"; and FIG. 7 illustrates the circuit condition when the step stalls in a partially extended position, causing the circuit breaker to open and to retract the step by reversing the motor.

DETAILED DESCRIPTION OF THE DRAWING

FIG. 1 illustrates the step 12 in its installed and extended position on a vehicle 10 below the vehicle door 11 (both illustrated in phantom). The step system includes a mounting frame 13 mounted under the vehicle floor below the door 11. The step 12 is connected to the mounting frame by four pivoted links 14 which connect between the step 12 and the mounting frame 13 and cooperate therewith to form a parallelogram mechanism so that the step 12 is movable between an extended position illustrated in FIG. 1 and a retracted position in which it is pivoted up against the underside of the mounting frame 13 and does not project beyond the vehicle side wall.

A direct current electric motor 16 includes a crank linkage 17 connected to an arm on a shaft 18 supporting the outer two pivoted links 14. When the crank linkage rotates, the step moves back and forth between the extended and retracted positions, with 180 degrees of crank rotation occurring between each of the extended and retracted positions.

Mounted adjacent to the motor is a control box 19 containing most of the circuitry described below. However, one of the circuit relays is preferably remotely mounted within a protected location on the vehicle, and is connected to the control box by a group of lead wires 21.

Reference should now be made to FIG. 2, which illustrates the overall control circuit for the step system. The control system includes a single-pole, double-throw selector switch 22 which may be mounted on the vehicle dashboard or adjacent to the vehicle door. This switch is operable between two positions: an "on" position illustrated in FIG. 2, and an "off" position. The circuit also includes a single-pole, double-throw door relay 23, which is operated by a magnetic door switch 24.

Mounted within the control box 19 are first and second rotary cams 26 and 27, which are connected to the output shaft of the motor 16 along with the crank linkage 17, so that the cams rotate through one full revolution when the crank linkage similarly rotates through one full revolution. Therefore, the cams operate in timed relationship to the linkage which actually drives the step 12.

A first cam-operated switch 28 is a double-pole, double-throw switch connected for operation by the first rotary cam 26. A second cam-operated switch 29 is a single-pole, single-throw switch operated by the cam 27 and constitutes the emergency retraction switch that operates to automatically retract the step in the event that it stalls, causing a circuit breaker 31 to open. The direction of the motor rotation is controlled by a double-pole, double-throw reversing relay 32. Both of the switches 28 and 29 are preferably snap-acting microswitches having cam followers supported on spring arms which allow overtravel.

Twelve-volt battery power is supplied to one of the poles 33 of the selector switch 22 by a conductor 35. The other pole 34 is connected to the accessory terminal of the vehicle ignition switch 36 by a conductor 37. Since the step is normally operated when the vehicle is stopped or parked, and when the ignition switch 36 is open, the normal operation of the step is powered by the battery conductor 35 when the selector switch is in the position illustrated in FIG. 2.

The common terminal 38 of the selector switch 22 is connected to one side of the coil 39 of the door relay 23 and also to the common contact 41 thereof by a conductor 42. One pole 43 of the door relay 23 is connected by a conductor 44 to a contact 46 of the cam-operated switch 28. The other pole 47 of the door relay 23 is connected by a conductor 48 to the other pole 50 of the cam-operated switch 28. The conductor 44 is also connected to one side of a courtesy light 51, the other side of which is connected to ground 52 by a conductor 53. Therefore, when voltage is applied to the conductor 44, the courtesy light 51 lights.

The conductor 53 also connects to the terminal 54 of the magnetic door switch 24 and the pole 56 of such switch is connected to the other side of the coil 39. The two contacts 57 and 58 are connected together by a conductor 59, which also connects with one terminal 61 of the circuit breaker 31. The other terminal 62 of the circuit breaker 31 is connected by a conductor 63 with one end of the coil 64 of the reversing relay 32 and also with one of the poles 66 of such relay. Further, the conductor 63 connects with one terminal 67 of an indicator light 68 provided by the selector switch 22 and to one side of a resistor 69. The other terminal 71 of the indicator light 68 is connected to ground through the conductor 53.

The other side of the coil 64 is connected by a conductor 72 to ground 52 through a resistor 69. Such conductor 72 also connects to the pole 73 associated with the pole 66 of the reversing relay and the pole 74 thereof. Consequently, both the poles 73 and 74 are grounded through the resistor 69.

The conductor 48 also connects with one contact 76 of the emergency retracting switch 29. The other contact 77 thereof is connected through a conductor 78 to the pole 79 associated with the pole 74 of the reversing relay 32. The terminal 81 associated with the two poles 66 and 73 of the reversing relay is connected to one motor terminal 82 by a conductor 83. The terminal 84 associated with the two poles 74 and 79 is connected to the other terminal 86 of the motor by a conductor 87.

When the circuit is in the condition of FIG. 2, in which the selector switch 22 is in the operative position, the door is closed and the step is retracted, power is supplied to one side of the coil 39 of the door relay 23. However, since the door is closed, the normally closed magnetic switch 24 is opened by the magnet 91 mounted in the door. The magnetic switch 24 is a normally closed switch mounted in the door frame in a position in which it is adjacent to a magnet 91 when the door is closed and is opened by such magnet. In such condition, the door relay terminal 41 is connected to the pole 47, which is in turn connected to the contacts 50 and 76 of the two cam-operated switches 28 and 29, respectively. However, in the retracted position, the cam 26 operates the switch 28 associated therewith to close the contacts 46 and 58 and open the contacts 50 and 57. Similarly, in the step-retracted position, the contacts 76, 77 of the cam-operated switch 29 are opened by the cam 27. Therefore, even though power is supplied to the terminals 50 and 76, the circuit is completely shut off and no current flow exists.

In the circuit condition of FIG. 3, the selector switch 22 remains in the operative condition so battery power is connected to one side of the relay coil 39 and also to the terminal 41 of such relay 23. The door, however, has been opened, allowing the magnetic door switch to close, to energize the coil 39 of the relay 23, causing it to connect the terminal 41 to the pole 43. Therefore, battery power is supplied by the conductor 44 to contact 46 of the cam-operated switch 28. When the step is retracted, and until the step reaches the extended position, the cam 26 operates the switch 28 to connect the two contacts 46 and 58. Therefore, power is supplied through the circuit breaker 31 to the coil 64 of the reversing relay 32, causing such relay to pick up and supply battery power through the pole 66 to the terminal 82 of the motor. Since the reversing relay is picked up at this time, the other terminal 86 of the motor 16 is connected through the pole 74 to ground 52, causing the motor to operate.

The cams 26 and 27 are illustrated in FIG. 3 in a position they reach during the extension of the step. At such point in the cycle, the cam 27 operates the associated switch 29 to connect the two contacts 76 and 77. This causes power to be supplied through the conductor 78 to the pole 79 of the reversing relay 32. However, since the reversing relay is picked up at that point in the cycle, the pole 79 is disconnected.

During the extension of the step, power is also supplied, through the conductor 44 to the courtesy light 51, which provides illumination of the step. Also, the indicator light 68 is operated, indicating that the step is extending.

The cam 26 is a 180-degree cam which operates the switch 28 from one position to the other at the end of each 180-degrees of rotation of the crank linkage 17 produced by the motor 16. Therefore, when the step reaches the extended position, the two contacts 46 and 58 are opened and the switch returns to a condition in which the contacts 50 and 57 are closed. This is the condition of the circuit illustrated in FIG. 4, in which the step is fully extended and the door is open.

When the step reaches its extended position, a condition exists as illustrated in FIG. 4, if the door remains open. Upon reaching the extended position, the cam 26 operates the switch 28 to open the contacts 46 and 58 and close the contacts 50 and 57. Since the door remains open, the magnetic switch 24 remains closed, causing the door relay 23 to remain energized, so that power is supplied through the door relay to the conductor 44. Therefore, the power is supplied only to courtesy light 51, which remains on to continue the illumination of the step. However, the motor stops in the extended position because power does not pass the switch 28. Also, since the conductor 48 is not supplied with power by the door switch, the closed switch 29 does not cause any operation of the system. Therefore, so long as the selector switch 22 is in the operated position, and the door is open, with the step extended, the motor will not operate, and only the courtesy light 51 will remain on to provide step illumination.

Referring to FIG. 5, as soon as the door is closed, the magnetic door switch 24 opens to de-energize the coil 39 of the door relay 23, causing such relay to close with the pole 47 to energize the conductor 48. Since the contacts 50 and 57 are closed when the door is extended, power is supplied to the coil 64 of the reversing relay 32, causing it to immediately pick up. Therefore, the fact that the cam-operated switch 29 is in the closed condition does not cause motor reversal. Instead, the terminal 82 of the motor 16 is supplied with battery power while the terminal 86 is connected to ground 52 through the reversing relay, and the motor continues to operate in the same direction that caused extension. However, since the crank linkage is passed through a dead-center position, the continued rotation of the motor causes retraction of the step.

After 180 degrees of rotation of the cam 26, the switch 28 again returns to the position of FIG. 2 and terminates the operation of the motor in the retracted position. Further, as the step approaches the retracted position, the cam 27 opens the switch 29, so reverse operation of the motor cannot occur. It should be noted that as soon as the door is closed, the courtesy light 51 is extinguished, but the indicator light is energized until the step is fully retracted, after which it turns off.

So long as the selector switch 22 is in the operative position supplying battery power to the circuit, opening of the door will cause the step to extend and the courtesy light to illuminate the step. Also, whenever the door is closed, the step will retract and the courtesy light is extinguished. During the extension or retraction, the indicator light 68 is illuminated to indicate the operation of the step.

In the event that it is desired to leave the step extended, regardless of the position of the door, while the vehicle is in a parked position or the like, the selector switch is operated to disconnect the battery supply conductor 35 and connect with the ignition conductor 37. If the selector switch is moved to such off position while the step is extended, it will remain extended so long as the vehicle ignition switch is not turned on. This is because no power is supplied to the circuit, and it is completely shut down. Consequently, the courtesy light is also extinguished when the selector switch is operated to the off position.

Automatic step retraction occurs in the event that the vehicle operator fails to remember that the step is extended when the engine is started. As soon as the ignition switch is turned on while the door is closed, power is again supplied to the circuit through the conductor 37 and a condition, illustrated in FIG. 6, occurs which is identical to the condition of FIG. 5 except for the fact that power is supplied to the circuit through the ignition conductor 37 rather than the battery conductor 35. Therefore, the step automatically retracts when the vehicle ignition is turned on with the door closed and the danger of operating the vehicle with the step inadvertently extended is avoided.

With this invention, the system is protected against damage in the event that a blockage occurs to prevent full extension of the step, causing the step to stall in a partially extended condition. In such event, a locked rotor condition will exist within the motor, causing a substantial increase in the current draw. This causes the circuit breaker 31 to open. When the circuit breaker opens, the motor is shut off and remains off until the circuit breaker again closes. Preferably, the circuit breaker is selected to automatically cycle back and forth between the open and closed conditions, causing the motor and step to be pulsed toward the extended position with repeated cycles so long as the door remains open. However, the circuit breaker is in the off condition a sufficient time to prevent motor burnout.

As the circuit breaker opens and closes, the indicator light is turned on each time the circuit breaker is closed, giving an indication that proper extension of the step is not occurring. The vehicle operator merely needs to close the door and the step will automatically retract due to a circuit condition indicated in FIG. 7, in which the step is partially extended, the door is closed, and the circuit breaker is open.

In such condition, the magnetic switch opens, causing the door relay 41 to return to its normal position connecting the power to the pole 47. This discontinues any further extending operation because the contacts 50 and 57 are open by the cam 26. Further, the reversing relay drops out as soon as the door is closed, and the motor is supplied with reverse polarity through the switch 29 and the poles 79 and 73 until the step is retracted, causing the opening of the switch 29.

Normal retraction, which utilizes motor rotation in the same direction as the direction of motor rotation, causing step extension, cannot be used to retract the step from a partially extended, stalled condition. However, since the motor retracts the step by reverse rotation, the step can retract even though it has not reached a fully extended position. When the step reaches the retracted position, the cam 27 opens the switch 29 to prevent further operation.

With this invention, protection is provided against damaging overloads when the step is prevented for any reason from extending fully. Further, in the event that the extension of the step is resisted by snow or ice, the pulsing of the system occurring as the circuit breaker automatically opens and closes very often can overcome the blockage and allow full extension of the step.

Since the protection is provided by a simple circuit breaker which may be of a bimetal, automatic resetting type, and since electronics are not involved in the operation of the circuit, a high degree of reliability is achieved. Normal operation utilizes a first circuit through the circuit breaker and the same direction of rotation is utilized for normal extension and retraction. However, if full extension cannot be achieved when the door is closed, a second circuit, consisting of the switch 29 and conductor 78, causes reverse operation of the motor so that retraction can be achieved.

Although the preferred embodiment of this invention has been shown and described, it should be understood that various modifications and rearrangements of the parts may be resorted to without departing from the scope of the invention as disclosed and claimed herein.

What is claimed is:

1. In a system for extending and retracting a step, including an electric motor, coupling means connecting said step and motor operable to extend and retract the step, and a circuit for energizing the motor, the improvement wherein said circuit comprises a first circuit means including a circuit breaker and connected to selectively energize said motor via said circuit breaker in one rotation direction to cause said coupling means to extend and retract said step, and second circuit means operative during an open condition of said circuit breaker for energizing said motor in an opposite rotation direction to cause said coupling means to retract said step.

2. The system of claim 1, further comprising a first cam-operated switch connected to apply operating current to said first circuit, shaft means coupled to said motor, and first cam means coupled to said shaft means for operating said first cam-operated switch.

3. The system of claim 2, wherein said first cam-operated switch has first and second contact paths, and said first cam means comprise means for selectively closing said first and second contact paths at predetermined angular displacements of said shaft means.

4. The system of claim 2, wherein said second circuit means comprises a second cam-operated switch, and second cam means coupled to said shaft means for closing said second cam-operated switch substantially only during extension of said step, and further comprising means for selectively applying operating current to said second circuit means.

5. The system of claim 1, further comprising a relay having a relay coil connected to be energized via said circuit breaker, said first circuit means comprising normally open contacts of said relay connected to apply current of one polarity to said motor via said circuit breaker.

6. The system of claim 6, wherein said second circuit means comprises normally closed contacts of said relay connected to apply current of a polarity opposite said one polarity to said motor.

7. In a system for extending and retracting a step of a vehicle, including an electric motor, coupling means connecting said motor and step to move the step between extended and retracted positions, and a circuit for energizing the motor, the step being positioned adjacent a door of the vehicle, the improvement wherein the circuit comprises a circuit breaker, a door switch having "door open" and "door closed" contacts and a center contact adapted to be connected to a source of current, first and second cam switches connected respectively between said "door open" and "door closed" contacts and one terminal of said circuit breaker, first circuit means for selectively connecting said motor to the other terminal of said circuit breaker for energizing said motor with a current of a first polarity for causing said coupling means to extend and retract said step, and second circuit means operative during an open condition of said circuit breaker for energizing said motor with a current of a second polarity opposite said first polarity for retracting said step.

8. The system of claim 7, further comprising shaft means coupled to said motor for rotating first cam means for selectively closing said first and second cam switches respectively, whereby said first cam switch closes upon retraction of said step and said second cam switch closes upon extension of said step.

9. The system of claim 8, wherein said second circuit means includes another cam switch, and further comprising a second cam means on said shaft means for closing said another cam switch while said step is being extended.

10. The system of claim 7, further comprising a relay having a coil connected to said other terminal of said circuit breaker, said first circuit means including normally open contacts of said relay connected to apply current of one polarity to said motor via said circuit breaker, and said second circuit means includes normally closed contacts of said relay connected to apply current of a polarity opposite said one polarity to said motor.

11. The system of claim 7 for a vehicle having an ignition switch, said system further comprising a control switch having a first position for applying current to said center contact of said door switch and a second position for connecting said ignition switch to said center contact.

* * * * *